Nov. 30, 1965 J. L. BREITBORD 3,221,099
ELECTRONIC DISPLAY SYSTEM FOR USE WITH PHOTOGRAPHIC TRANSPARENCIES
Filed May 1, 1962
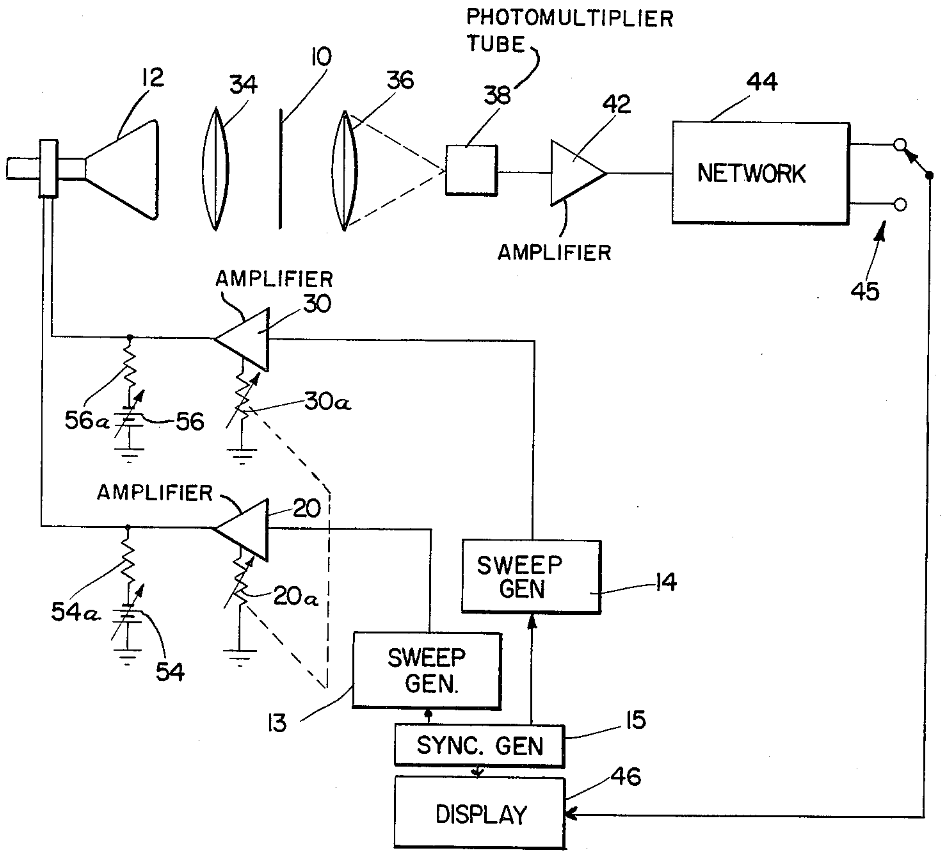
INVENTOR.
JACOB L. BREITBORD
BY
Blair and Buckles
ATTORNEYS 3,221,099
Patented Nov. 30, 1965

1

3,221,099

ELECTRONIC DISPLAY SYSTEM FOR USE WITH PHOTOGRAPHIC TRANSPARENCIES

Jacob L. Breitbord, Framingham, Mass., assignor to Itek Corporation, Lexington, Mass., a corporation of Delaware Filed May 1, 1962, Ser. No. 191,482
7 Claims. (Cl. 178—7.2)

The present invention relates to an electronic scanner for displaying transparencies and in particlar to a scanner which includes means for electronically producing a magnified display with increased resolution. The invention also relates to an improved method for magnifying electronically displayed transparencies.

Electronic viewing of transparencies has generally been accomplished by means of "flying spot" scanners. A scanner of this type utilizes a cathode ray tube as a light source for scanning the transparency. A raster similar to a television raster is formed on the face of the tube by means of a moving electron beam and it is imaged on the transparency. Thus, a spot of light is swept over the transparency line-by-line in the manner of formation of a television image. The light transmitted through the transparency, which varies according to the optical density thereof, is optically focused onto a detector which converts the transmitted light into a time-varying voltage. The output of the detector is then conventionally amplified and fed to a suitable display device for reconstituting the image on the transparency. The display device may include a cathode ray tube of the type used in an ordinary television receiver.

A flying spot scanner system has several advantages over purely optical display systems. For example, the output of the transducer may be fed to several display devices, which may be remotely located from the transparency. In addition, several types of image processing techniques can be readily incorporated in an electronic system, including conversion from positive to negative images, image enhancement, gamma stretching and frequency filtering. However, with a one to one correspondence between the size of the scanning field and that of the transparency, the resolution capability of the display device is dependent upon the number and width of the scanning lines produced in the scanner tube. Thus, a magnified image may be provided by simply increasing the size of the displayed image, but this does not yield better resolution of details, since the spacing between the lines is increased and the viewer must stand farther back from the display device for the individual scanning lines to disappear. If a greater number of lines per frame are used, then the bandwidth requirements of the system as a whole are correspondingly increased.

It is accordingly an object of the invention to provide an improved flying spot scanner system capable of magnification of the displayed image and increased resolution.

It is a further object of the invention to provide a scanner system of the above character which requires less bandwidth when a magnifying mode of operation is employed.

It is a further object of the invention to provide a scanner system of the above type characterized by simple and inexpensive modifications of existing flying spot scanner systems.

2

Another object is to provide an improved method for magnifying electronically displayed transparencies and the like.

Other objects of the invention will in part be obvious and will in part appear hereinafter.

The invention accordingly comprises the features of construction, combination of elements, and arrangement of parts which will be exemplified in the construction hereinafter set forth, and the scope of the invention will be indicated in the claims.

For a fuller understanding of the nature and objects of the invention, reference should be had to the following detailed description taken in connection with the accompanying drawing, which is a diagrammatic view of a flying spot scanner system incorporating the invention.

With reference to the drawing, a transparency 10, which is to be displayed, is positioned to be scanned by a moving spot of light, generated by a scanner tube 12. The tube 12 may be a conventional cathode ray scanner tube such as a Dumont type 5CKP16. The electron beam in the tube 12 is swept across the face of the tube by horizontal and vertical drive voltages generated by sweep generators 13 and 14. The generators 13 and 14, in turn, are synchronized by the output of a "sync" generator 15. Specifically, the generator 13 delivers a horizontal drive voltage to a horizontal drive amplifier 20, whose output is applied to the horizontal deflection coils of scanner tube 12. Similarly, the vertical drive voltage output of the sweep generator 14 is applied to the vertical deflection coils of scanner tube 12 after amplification by a vertical drive amplifier 30. This produces on the face of scanner tube 12 a raster of substantially horizontal lines formed by the resulting movement of the electron beam. The amplifiers 20 and 30 include gain control means, illustratively variable resistors 20*a* and 30*a*, for adjusting the amplitudes of the drive voltages at their outputs.

The raster on the tube 12 is imaged on the transparency 10 by lens 34 so that the transparency is swept in successive parallel lines by the spot of light forming the raster. The light, which is transmitted through transparency 10, is collected by a lens 36 and focused on a photoelectric transducer 38, illustratively a photomultiplier tube. As the light beam moves across the transparency, the intensity of the light which is transmitted through the transparency is modulated according to the optical density of the image of the transparency. The modulated light thus impinging on the transducer 38 produces at the output thereof a time-varying video signal corresponding to the scanned image on the transparency. The video signal is then amplified by an amplifier 42 and applied to a network 44, which may include image-reversal (electrically, phase inversion) or other electronic processing functions as desired. A switch 45 at the output of the network 44 is used to select the polarity of the video signal corresponding to reversal or non-reversal of the image. Finally, the video signal is applied to display device 46, where it modulates the intensity of the electron beam of a cathode ray display tube.

In order to reconstitute the image of the transparency in the display device, the intensity-modulated electron beam in the display device 46 must be deflected in synchronism with the deflection of the beam in the scanner tube 12. This is accomplished by means of "sync" signals from the generator 15.

As noted above, the displayed image may be magnified by increasing the size of the display on tube 46. However, this gives no increase in resolution, particularly since the viewer must stand farther back from the display screen in order to minimize the effect of the raster.

According to the present invention, increased magnification of the displayed image is produced by electronically reducing the size of the scanning raster while maintaining the size of the displayed image constant. Thus, a smaller area on the transparency 10 covered by the raster is displayed over the full area of the viewing screen of the display device 46. This provides not only a magnification of the image to be studied but also a substantial increase in the resolution of the displayed image. Since reduction of the scanning raster places the lines thereof closer together, in the limit until they overlap somewhat, there is less unscanned area on the transparency, which insures that more of the information contained by the transparency is actually translated to display device 46. Since the scanning raster is smaller, the displacement of the flying spot is smaller and consequently the spot moves more slowly. This increases the amount of information transmitted from the magnified portion of the transparency not only without increasing the bandwidth requirement for the system, but actually with a decrease in the bandwidth requirement.

Furthermore, slowing of the horizontal speed of the flying spot decreases the adverse effects of phosphor persistence in scanner tube 12. More specifically, with the slower speed, the effective size of the spot can be reduced, and this results in an increase in resolution even beyond what one would expect from a system of this type.

This reduction in the size of the canning raster is accomplished by varying the horizontal and vertical drive voltages through adjustment of variable resistors 20*a* and 30*a*. Advantageously, these resistors may be ganged for simultaneous control of both horizontal and vertical size to maintain the proper aspect ratio. They should have a range of adjustment sufficient to reduce the raster size to the point where the individual trace lines slightly overlap, in order to provide maximum resolution of image details. Any further reduction in the vertical dimension will not improve resolution.

Also provided are means for shifting the position of the reduced scanning raster over the face of scanner tube 12. Thus, a variable direct voltage biasing source, indicated at 54, biases the output voltage of the horizontal drive amplifier 20, while a similar biasing source 56 is connected at the output of the vertical amplifier 30. The sources 54 and 56 are connected across the amplifier output terminals in series with resistors 54*a* and 56*a*. Thus, the output terminals are in effect summing points for the biasing voltages from the sources 54 and 56 and the drive voltages from the amplifiers 20 and 30. By suitably adjusting the voltages of sources 54 and 56, the reduced raster may be selectively positioned on the face of scanner tube 12 so that the light beam scans any desired portion of transparency 10. Accordingly, the portion of transparency 10 displayed in enlarged form on the display device 46 may be selected by varying the direct voltages supplied by the sources 54 and 56, without the necessity for physically repositioning the transparency 10 or adjusting the optical system associated with the transparency.

The practice of the present invention is not limited to the particular scanner tube disclosed above, but may equally be applied to other types of scanner tubes, such as those using electrostatic deflection of the electron beam. Variations in the optical system and electronic circuitry are also within the scope of the invention. While the system is not limited to any particular horizontal and vertical drive frequencies, the ordinary commercial television frequencies have been found to be suitable.

It will thus be seen that the objects set forth above, among those made apparent from the preceding description, are efficiently attained and, since certain changes may be made in carrying out the above method and in the construction set forth without departing from the scope of the invention, it is intended that all matter contained in the above description or shown in the accompanying drawings shall be interpreted as illustrative and not in a limting sense.

It is also to be understood that the following claims are intended to cover all of the generic and specific features of the invention herein described, and all statements of the scope of the invention, which, as a matter of language, might be said to fall therebetween.

I claim:

1. In a flying spot scanner system wherein a raster is produced on the face of a scanner tube in the form of parallel lines of light and the light from the raster scans an optical image, the combination comprising means for reducing the size of the flying spot scanner raster sufficiently that the individual lines of light overlap, and means for adjusting the position of the entire reduced raster over the entire face of said scanner tube.

2. In a flying spot film scanner wherein a film is scanned by a moving spot of light and the light from said film is focused on a photoelectric transducer to produce a video signal corresponding to the optical density of said film, electronic magnification control means comprising a flying spot scanner tube having an electron beam for generating said light spot on a screen, said scanner tube having horizontal control elements for deflecting said electron beam in a horizontal direction and vertical control elements for deflecting said electron beam in a vertical direction, a source of selectively variable horizontal drive voltage connected to said horizontal control elements, whereby said light spot travels in parallel lines across said screen, a source of selectively variable vertical drive voltage connected to said vertical control elements whereby said parallel lines are uniformly spaced to form a raster on said screen, and means for adjusting said horizontal drive voltage and said vertical drive voltage sufficiently to expand said raster to fill said screen and to reduce said raster sufficiently so that said parallel lines overlap, whereby the area of said transparency being scanned may be varied.

3. A transparent film scanner including a scanner tube having an electron beam for producing a light spot on a screen, horizontal control elements for deflecting said beam in a horizontal direction, vertical control elements for deflecting said beam in a vertical direction, scanning control circuitry for said control elements including a sweep generator for producing a horizontal drive voltage whereby said light spot moves over said screen in a series of spaced parallel horizontal lines to form a raster, a first optical system to image said raster on a film whereby said spot sweeps across said film, a second optical system for collecting the light transmitted through said film on a photoelectric transducer, whereby the output of said transducer is a video signal corresponding to the optical density of said film, and a display device for reconstituting the image on said film from said amplitude modulated signal, the improvement comprising first manual control means for varying the drive voltage applied to said vertical control elements between a value sufficient to drive said beam substantially entirely across said screen and a value sufficiently small that said spaced parallel lines overlap, and second manual control means for varying the drive voltage applied to said horizontal control elements relatively at least as much as the variations in the drive voltage applied to said vertical elements.

4. The combination of claim 3 wherein said first and said second control means are ganged so as to provide a constant height-to-width ratio of said raster.

5. The combination of claim 3 further comprising variable biasing means for shifting voltage applied to said horizontal control elements so as to position said raster in any desired horizontal location on said screen.

6. The combination of claim 3 further comprising variable biasing means for varying the direct voltage applied to vertical control elements so as to position said raster in any desired vertical location on said screen.

7. An improved method of magnifying a selected portion of an image produced by a flying spot scanning system which scans an image source and is arranged to display the entire image, said method comprising the steps of reducing the raster formed by said flying spot to the size of said image portion on said source and shifting the position of the entire reduced raster to make said reduced raster coincide with said portion at said source.

References Cited by the Examiner

UNITED STATES PATENTS

| | | | |
|---|---|---|---|
| 2,075,818 | 4/1937 | Lubcke | 178—6 |
| 2,098,390 | 11/1937 | Iams | 178—7.5 |
| 2,244,251 | 6/1941 | Goldsmith | 178—7.5 |

OTHER REFERENCES

"Television Flying Slide Scanner" by A. J. Baracket, Electronics July 1954; pp. 134–137.

DAVID G. REDINBAUGH, *Primary Examiner.*